United States Patent

Kawajiri et al.

Patent Number: 6,112,577
Date of Patent: Sep. 5, 2000

[54] PIEZOELECTRIC RESONANCE TYPE KNOCK SENSOR FOR INTERNAL COMBUSTION ENGINE

[75] Inventors: Shogo Kawajiri; Junichi Suzuka; Osamu Shinkai, all of Nagoya, Japan

[73] Assignee: NGK Spark Plug Co., Ltd., Nagoya, Japan

[21] Appl. No.: 08/925,330

[22] Filed: Sep. 8, 1997

Related U.S. Application Data

[63] Continuation of application No. 08/818,469, Mar. 13, 1997, abandoned, which is a continuation of application No. 08/667,364, Jun. 21, 1996, abandoned, which is a continuation of application No. 08/183,343, Jan. 19, 1994, abandoned.

[30] Foreign Application Priority Data

Jan. 20, 1993 [JP] Japan ................................ 5-026307

[51] Int. Cl.$^7$ .................................................. G01L 23/22
[52] U.S. Cl. ........................................... 73/35.11; 73/579
[58] Field of Search .................................. 73/35.11, 579, 73/514.34

[56] References Cited

U.S. PATENT DOCUMENTS

| | | | |
|---|---|---|---|
| 4,225,802 | 9/1980 | Suzuki et al. | 310/321 |
| 4,254,354 | 3/1981 | Keem | 310/329 |
| 4,491,010 | 1/1985 | Brandt et al. | 73/35 |
| 4,630,465 | 12/1986 | Hatton | 73/35.11 |
| 4,658,650 | 4/1987 | Yorinaga et al. | 73/654 |
| 4,660,410 | 4/1987 | Asano et al. | 73/35.11 |
| 4,704,894 | 11/1987 | Inuzuka et al. | 73/35 |
| 5,218,870 | 6/1993 | Komurasaki et al. | 73/35 |

FOREIGN PATENT DOCUMENTS

2206415 12/1985 United Kingdom ............... 73/517 AV

*Primary Examiner*—Hezron Williams
*Assistant Examiner*—Richard A. Moller
*Attorney, Agent, or Firm*—Larson & Taylor

[57] ABSTRACT

A piezoelectric resonance type knock sensor that is highly responsive and easy to assemble, wherein a bulged round seat section (washer 7) arranged under the lower surface of a thin metal plate 5 and coaxally with a support bolt 9 in such a way that the outer diameter of the bulged round seat section exceeds the inner diameter of an annular piezoelectric element 5, the lower end of a resilient connector member 11*a* arranged between a rod-shaped output terminal 11 and the vibration sensing member 4 is resiliently held in contact with an upper electrode 5*a* of the annular piezoelectric element 5 at a position located inside the outer periphery of the bulged round seat section, and the resonance frequency of its vibration sensing member can be regulated very easily to make itself a highly responsive and effective knock sensor.

6 Claims, 7 Drawing Sheets

FIG.1

PRIOR ART

PIEZOELECTRIC RESONANCE TYPE KNOCK SENSOR FOR INTERNAL COMBUSTION ENGINE

This application is a continuation of Application Ser. No. 08/818,469 filed Mar. 13, 1997 now abandoned which is a continuation of Application Ser. No. 08/667,364 filed Jun. 21, 1996 now abandoned which is a continuation of Ser. No. 08/183,343 filed Jan. 19, 1994 now abandoned.

BACKGROUND OF THE INVENTION

This invention relates to a piezoelectric resonance tye-knock sensor to be rigidly connected to a cylinder or other component of an internal combustion engine to detect knocks that may occur in the cylinder of tile internal combustion engine.

Figure 1:
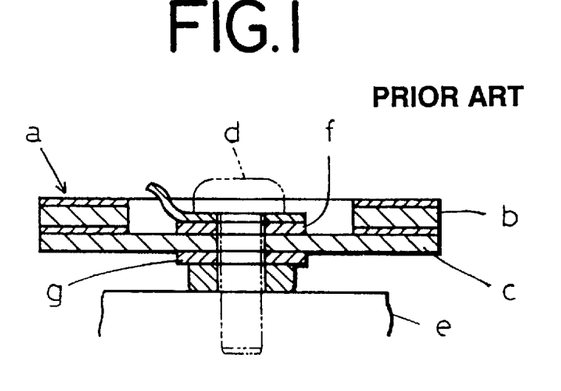
FIG. 1 is a longitudinal sectional view of a known vibration sensing member.

A known resonance type knock sensor is illustrated in FIG. 1. The illustrated sensor typically comprises a vibration sensing member a realized by bonding an annular piezoelectric element b to a surface of a thin metal plate c as an integral part thereof and mounted by a supporting bolt d driven through the center of the thin metal plate on a case e to be fitted onto an internal combustion engine. The resonance frequency of the vibration sensing member needs to substantially agree with the vibration frequency of knocks to be detected. Japanese Patent KOKAI No. 58-218621 discloses a convenient method of making the two frequencies agree with each other, if they mutually differ, by arranging a pair of washers f and g coaxially on the opposite surfaces of the thin metal plate c and allowing the supporting bolt d running therethrough. With such an arrangement, since the thin metal plate c is pinched at the center by the washers f and g having a same diameter and the upper washer f needs to be placed within the through bore of the annular piezoelectric element b, the outer diameter of the washers f and g is inevitably made smaller than the inner diameter of the annular piezoelectric element b.

A piezoelectric resonance type knock sensor is, by definition, designed to detect vibration of an internal combustion engine given rise to by knocks, or knocking vibration as referred to hereinafter. Knocking vibration of the engine can be prevented or minimized by controlling the timng of igniting the fuel in the engine according to the information obtained by way of the knock sensor. Since a highly responsive sensor can transmit output signals with a high voltage level and hence at a favorable signal to noise ratio (S/N ratio), such a sensor will be effectively used in the operation of suppressing knocking vibration and improve the performance of a knocking vibration suppressing mechanism incorporating it. In other words, existing knock sensors need improvements in the responsiveness if a higher efficiency is to be achieved for suppressing knocking vibration in internal combustion engines. On the other hand, an improved knock sensor needs to be assembled without difficulty and allow an easy operation for electric connections.

It is, therefore, an object of the present invention to provide a piezoelectric resonance type knock sensor for an internal combustion engine that meets the above identified requirements.

SUMMARY OF THE INVENTION

According to the invention, the above object is achieved by providing a piezoelectric resonance type knock sensor having a vibration sensing member formed by bonding an annular piezoelectic element provided with electrodes on its opposite surfaces to a surface of a thin metal plate as an integral part thereof and supported by a supporting bolt driven through the center of said thin metal plate, said vibration sensing member being arranged within a case to be fitted to an internal combustion engine and having a resonance frequency substantially the same as the knock vibration frequency of the engine, wherein a bulged round seat section is provided on the underside of said thin metal plate coaxially with the supporting bolt and has an outer diameter greater than the inner diameter of said annular piezoelectric element, a rod-shaped output terminal is provided to be extended through the case, a resilient connector member is arranged between one end of the rod-shaped output terminal and the vibration sensing member, said one end of the resilient connector member is resiliently held in contact with one of the electrodes of the annular piezoelectric element at a position located inside the outer periphery of the bulged round seat section, and the rod-shaped output terminal is electrically connected to said one electrode of the annular piezoelectric element by way of the resilient connector member.

The bulged round seat section may be realized in the form of a washer arranged directly on the lower surface of the thin metal plate or, alternatively, it may be realized by forming a bulged section on the support bolt so that the vibration sensing member may be supported by the bulged section.

The resilient connector member arranged between the one end of the rod-shaped output terminal and the vibration sensing member may be realized in a form having a resilient connector lug or, alternatively, it may be realized in the form of a conductive coil spring. In either case, the one end of the resilient connector member is resiliently held on the upper electrode of the annular piezoelectric element at a position located inside the outer periphery of the bulged round seat section.

The responsiveness τ of a resonance type knock sensor is expressed by the formula below.

$$\tau = K(CF+A)/(BW+B)$$

where K is constant of proportionality,
A and B are constants,
CF is resonance frequency and
BW is bandwidth.

Figures 2A, 2B:
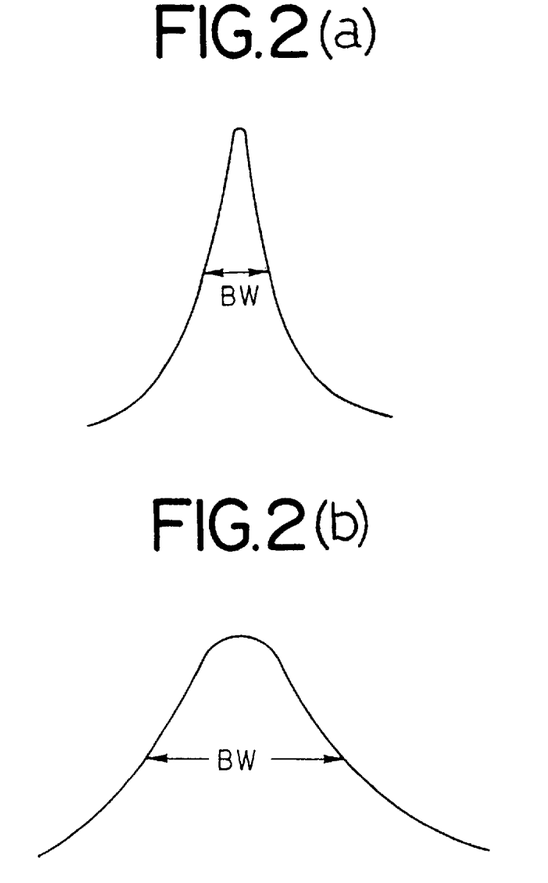
Figure 3A:
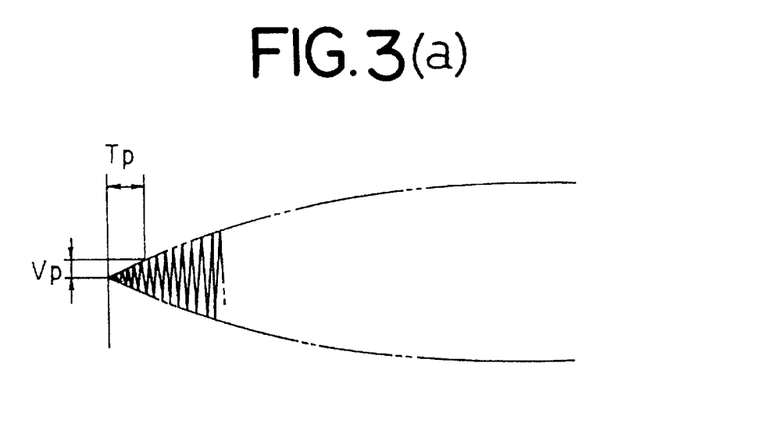
FIGS. 3(a) through (c) are schematic waveforms showing different relationships between knocking vibration and response waveform.
Figure 3B:
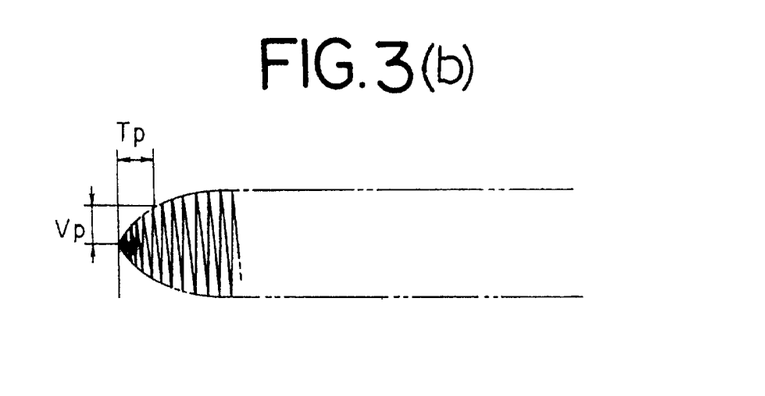
Figure 3C:
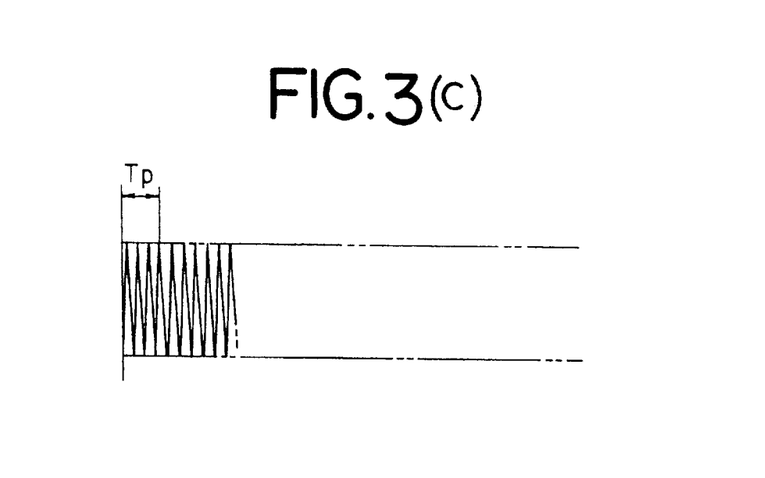
Figure 4:
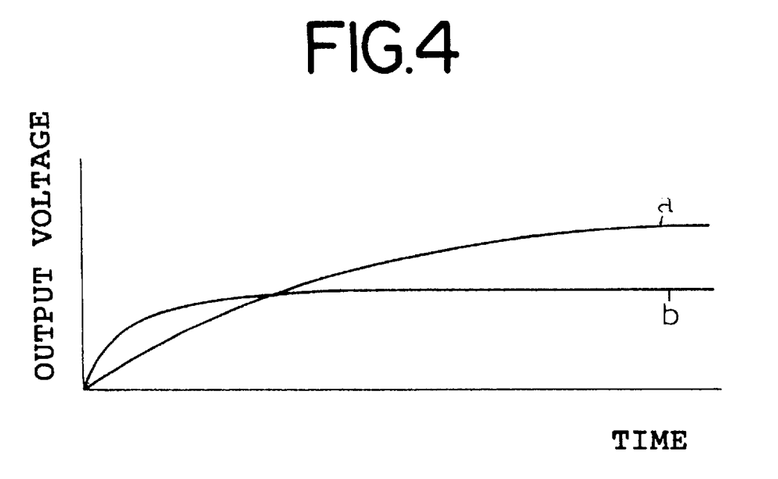
FIG. 4 is a graph showing different relationships between the output voltage and the elapsed period of time for different resonance type sensors.

As seen from the above equation, τ of a resonance type knock sensor becomes small to improve the responsiveness of the sensor as the bandwidth BW increases. This relationship will be understood by referring to FIGS. 2(a) through FIG. 3(c). If a knocking vibration as shown in FIG. 3(c) occurs and the bandwidth BW is as small as shown in FIG. 2(a), then the output voltage Vp of the sensor will be small as shown in FIG. 3(a) after time Tp has elapsed. On the other hand, if the bandwidth BW is as large as shown in FIG. 2(b), then the output voltage Vp of the sensor will be large as shown in FIG. 3(b) after time Tp has elapsed. The relationships between time Tp and output voltage Vp for the bandwidths of FIGS. 2(a) and 2(b) are shown in FIG. 4 to evidence that the responsiveness of a knock sensor of the type under consideration is improved as the bandwidth BW grows.

With a resonance type knock sensor according to the invention, the outer periphery of the bulged round seat section provides a node of wave for resonating knocking vibration and, by seeing the vibration waveform of the sensor, it will be confrmed that the sensor has a broadened bandwidth BW and hence an improved responsiveness.

Since the piezoelectric resonance type knock sensor according to the invention comprises a resilient connector member arranged between the rod-shaped output terminal and the annular piezoelectric element to electrically connect them without using a lead wire, the operation of assembling the sensor is greatly simplified.

Now, the invention will be described in greater detail by referring to the accompanying drawings that illustrate preferred embodiments of the invention.

BREF DESCRPTION OF THE DRAWINGS

FIGS. 2(a) and (b) are schematic waveforms showing different bandwidths;

DETAILED DESCRIPIION OF THE INVENTION

Figure 5:
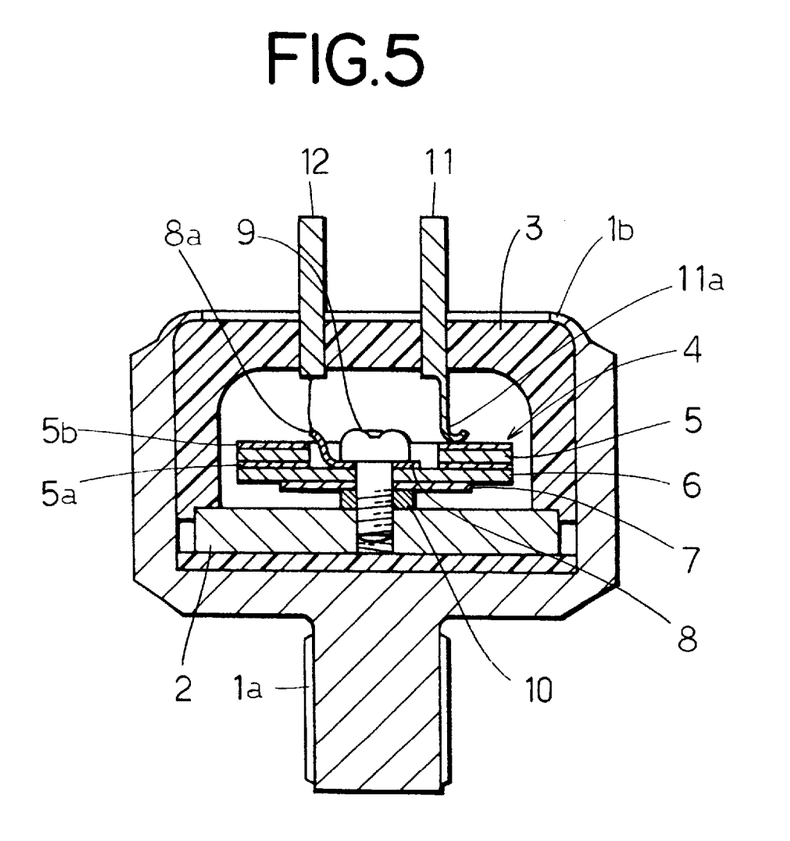
FIG. 5 is a longitudinal sectional view of a piezoelectric resonance type knock sensor according to the invention.
Figure 6:
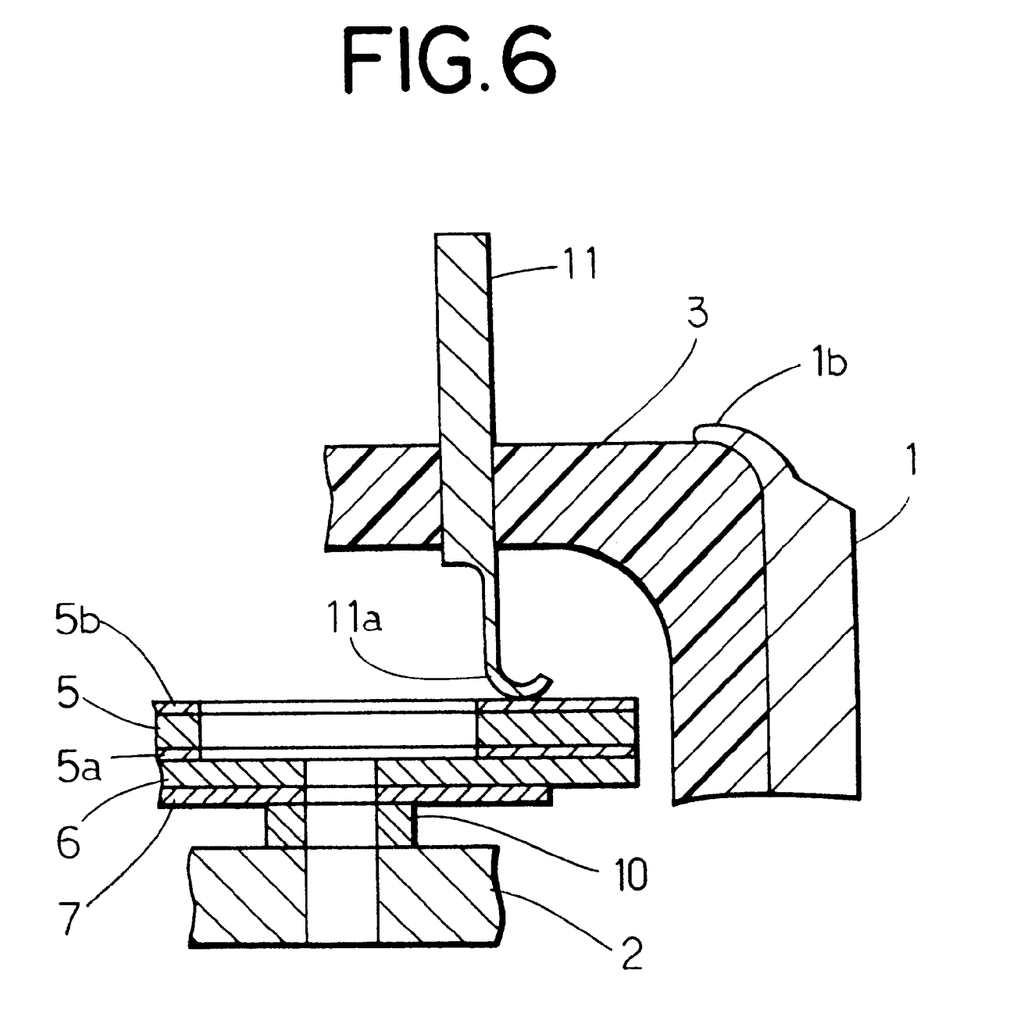
FIG. 6 is an enlarged sectional view of a principal section of the sensor of FIG. 5.

Referring firstly to FIGS. 5 and 6, a preferred embodiment of piezoelectric resonance type knock sensor according to the invention comprises a case 1 to be fitted to the wall of a cylinder of an internal combustion engine, said case having a U-shaped cross section and a fitting bolt la projecting from the center of its outer bottom wall, and a support plate 2 arranged on the inner bottom wall of the case 1. An inverted-cup-shaped insulator stopper 3 having an outer diameter equal to the inner diameter of the case 1 is tightly fitted into the case 1 through the opening of the case 1 and the bottom edge of the stopper 3 is securely held in engagement with the outer periphery of the support plate 2. The case 1, the support plate 2 and the stopper 3 are tightly held together as a thin extension 1b to the lateral wall of the case 1 extending from the upper edge of the case 1 is bent inwardly as shown in FIG. 5.

A vibration sensing member 4 is supported by and standing from the center of the support plate 2. The vibration sensing member 4 is realized by coaxially arranging an annular piezoelectric element 5 on a thin metal plate 6 having a central bore and bonding them together and a washer 7 is coaxially arranged on and brazed to the lower surface of the thin metal plate 6 to form a bulged round seat section for the purpose of the present invention.

An electrode plate 8 is arranged at the center of the vibration sensing member 4 and a supporting bolt 9 is made to be run through the bores of the thin metal plate 6 and the washer 7. After engagedly fitting a spacer nut 10 onto the bolt 9, the latter is driven into the bottom of the case 1 to securely and rigidly hold the vibration sensing member 4 within the case 1.

The stopper 3 is provided with a rod-shaped output terminal 11 and a rod-shaped grounding terminal 12 running therethrough, of which the grounding terminal 12 is electrically connected to an upwardly bent connector section 8a of the electrode plate 8 by way of a lead wre. The electrode plate 8 is by turn electrically connected to the lower electrode 5a of the annular piezoelectric element 5.

The rod-shaped output terminal 11 has at its lower end a resilient connector lug 11a typically made of a leaf spring as an integral part thereof and the free end of said connector lug 11a is resiliently held in contact with the upper electrode 5b of the annular piezoelectric element 5 at a position located inside the outer periphery of the washer 7 (bulged round seat section). With such an arrangement, the rod-shaped output terminal 11 is electrically connected to the upper electrode Sb of the annular piezoelectric element 5 without requiring a lead wire.

Once a knock sensor having a configuration as described above is subjected to knocking vibration, the outer peripheral section of the thin metal plate 6 and that of the annular piezoelectric element 5 turn up and down to produce a potential difference in the annular piezoelectric element 5 and generate an electric signal to be transmitted through the rod-shaped output terminal 11. If the resonance frequency of the vibration sensing member 4 and the knocking frequency agree with each other under this condition, the annular piezoelectric element 5 is remarkably strained to provide the output signal at a maximum level.

It should be noted here that the outer diameter of the washer 7 (bulged round seat section) is made greater than the inner diameter of the annular piezoelectric element 5 and the outer periphery of the washer 7 provides a node of wave for the vibration of the thin metal plate 6.

Figure 7:
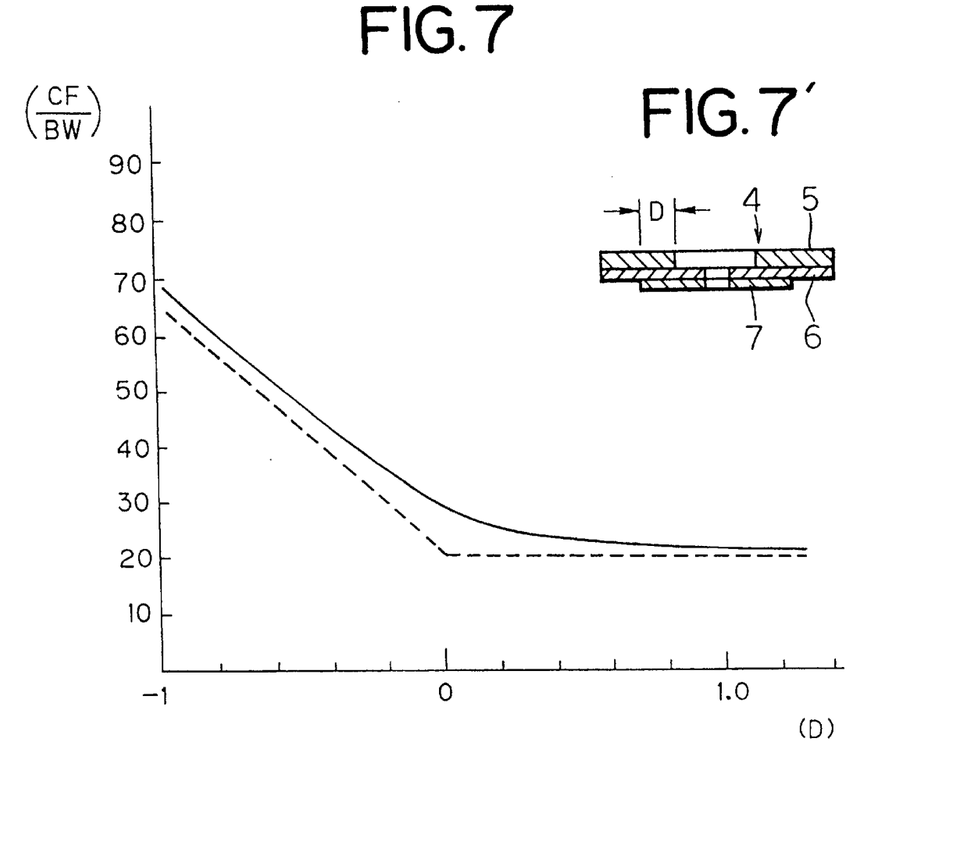
FIG. 7 is a graph showing the relationship between the difference D, of the inner diameter of the annular piezoelectric element and the outer diameter of the washer located therein as shown in FIG. 7, and the responsiveness of the sensor.

As a result of a series of experiments conducted by the inventor of the present invention, it was found that the difference D between the outer diameter of the washer 7 and the inner diameter of the annular piezoelectric element 5 as shown in FIG. 7' and the responsiveness of the vibration sensing member 4 which is defined by CF/BW, where CF is the resonance frequency of the vibration sensing member 4 and BW is the bandwidth, has a relationship as illustrated by the graph of FIG. 7. As seen in FIG. 7, when the outer diameter of the washer 7 is smaller than the inner diameter of the annular piezoelectric element 5 (that is D has a negative value), CF/BW shows a large value which is inversely proportional to D until D nearly gets to nil (D=0). On the other hand, when D has a positive value, CF/BW shows a substantially unchanging relationship to provide an asymptotic line which is very close to a horizontal line representing a small value for CF/BW obtained when D=O. Differently stated, the sensor shows an excellent responsiveness when D has a positive value.

An additional advantage of the sensor having an above described configuration is that, since the washer 7 is arranged on the underside of the thin metal plate 6, its contour can be defined only in terms of its relationship with the inner diameter of the annular piezoelectric element 5 without being subjected to any external restrictions. This means that the resonance frequency of such a vibration sensing member can be controlled very easily.

Figure 8:
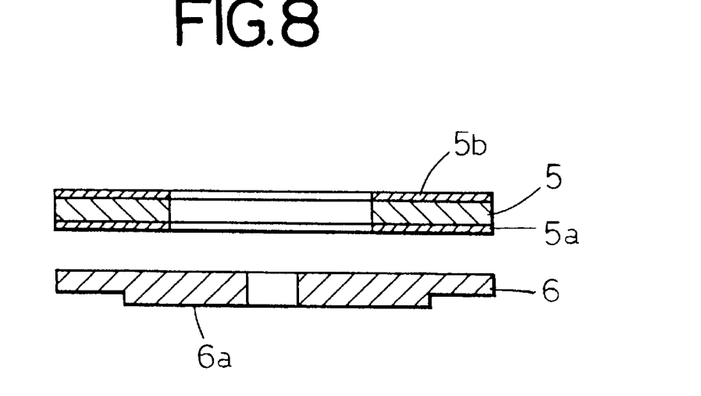
FIG. 8 is a longitudinal sectional view of a modification of the principal section of the sensor of FIG. 1.

The bulged round seat section in the above embodiment is realized by the washer 7 arranged under the thin metal plate 6. It may alternatively be produced by forming a coaxially bulged section 6a on the center of the thin metal plate 6 itself as shown in FIG. 8. A vibration sensing member having such a bulged round seat section also shows an improved responsiveness when the outer diameter of the bulged section is made greater than the inner diameter of the annular piezoelectric element 5.

The portion of the annular piezoelectric element 5 that is found inside the outer periphery of the bulged round seat section (washer 7, bulged section 6a), or the portion corresponding to D, is less apt to vibration because it is firmly held to the bulged round seat section. Thus, the vibration sensing member 4 can freely vibrate if the rod-shaped output terminal 11 is directly connected to it. More specifically, the annular piezoelectric element 5 can be electrically connected to any external object without damaging the responsiveness of the vibration sensing member 4 if the rod-shaped output terminal 11 is provided at its lower end with a resilient connector lug 11a which is resiliently held in contact with the upper electrode 5b of the annular piezoelectric element 5 as described earlier. Such an arrangement of the resilient connector lug 11a eliminates the use of a lead wire to firmly establish an electric connection of the rod-shaped output terminal 11 and the annular piezoelectric element 5 that will not be adversely affected by a loosely fitted stopper 3 and/or external impacts.

Thus, with the provision of D having a positive value, the operation of assembling and electrically connecting the components of the piezoelectric resonance type knock sensor is dramatically simplified.

Figure 9:
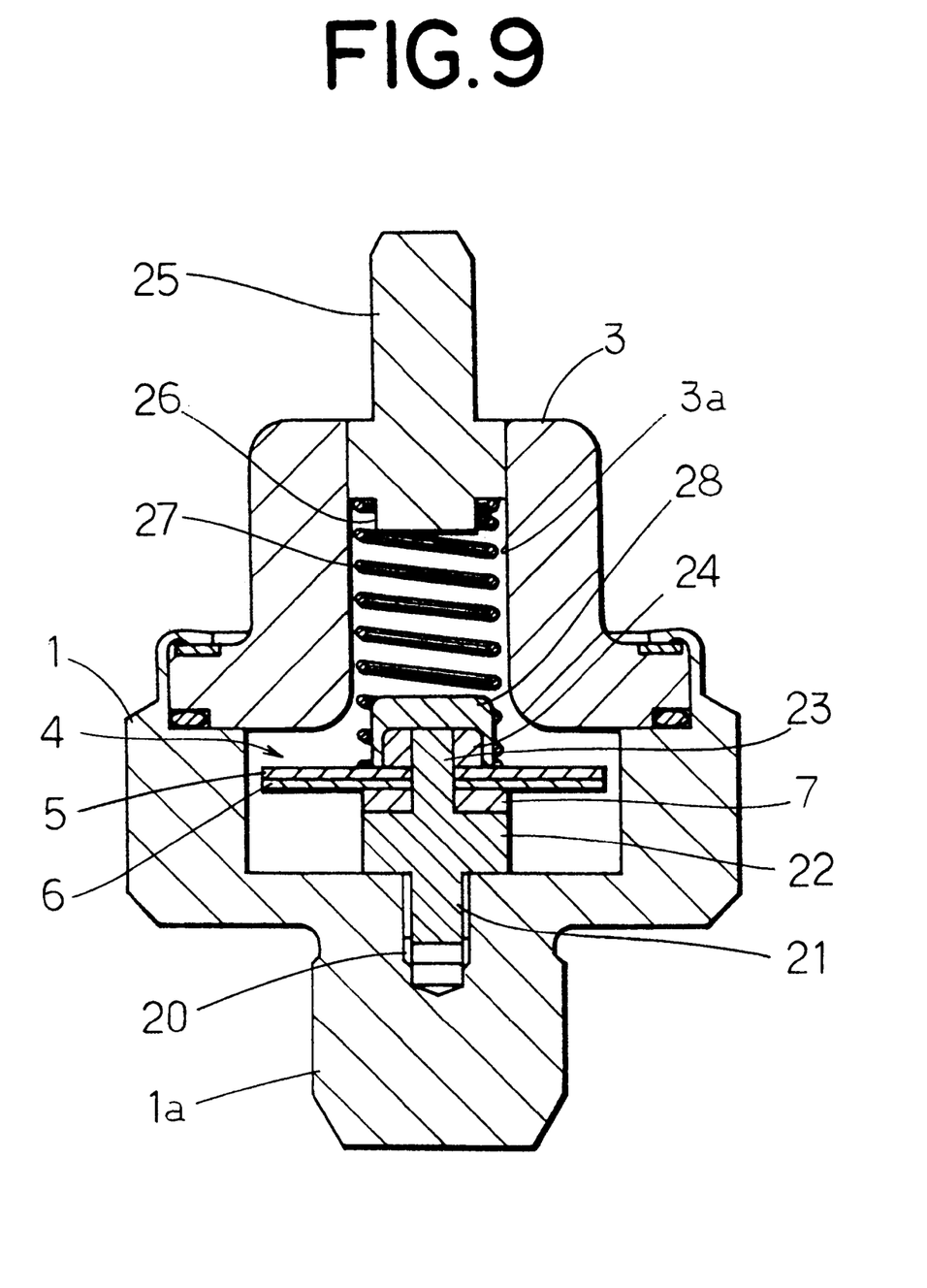
FIG. 9 is an enlarged longitudinal sectional view of a part of a resonance type knock sensor according to the invention and realized with an alternative mode of electric connection between the rod-shaped output terminal and eannular piezoelectric element.
Figure 10:
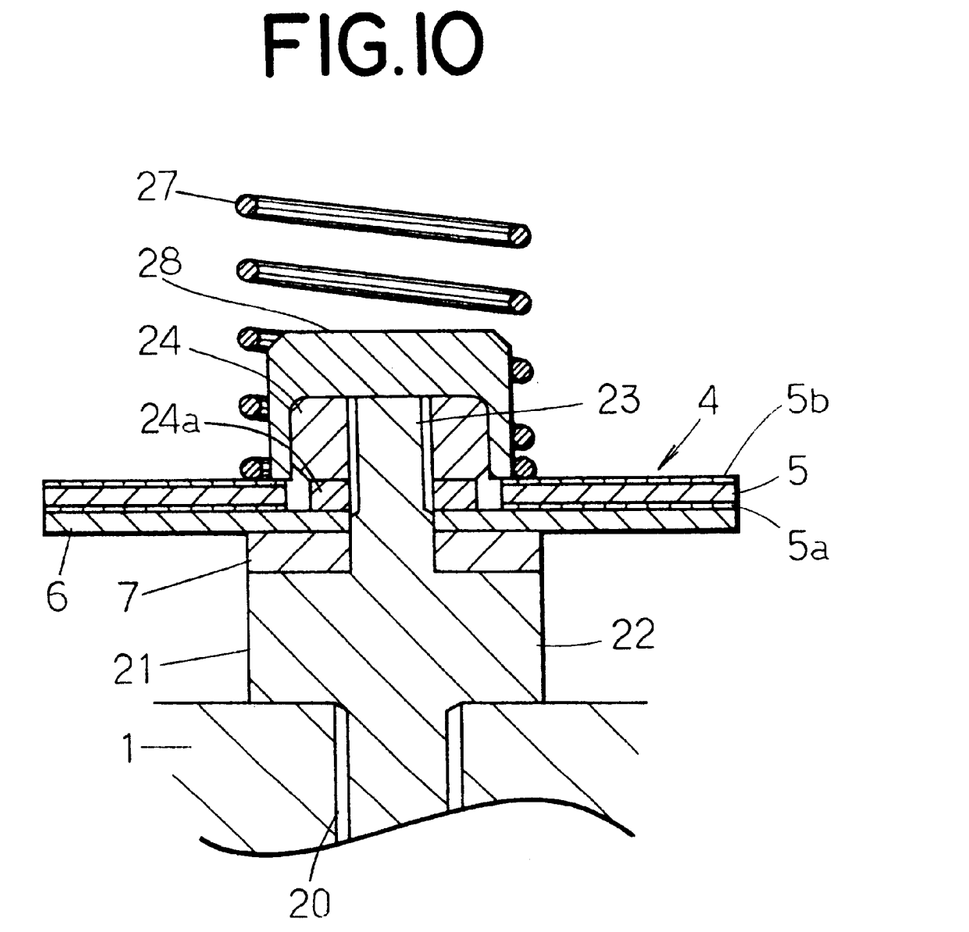
FIG. 10 an enlarged sectional view of a principal section of the part of FIG. 9.

FIGS. 9 and 10 illustrate an alternative mode of electric connection of the components of a piezoelectric resonance type knock sensor according to the invention including a rod-shaped output terminal 25 and a annular piezoelectric element 5. The components that are same as or equivalent to their counterparts of FIGS. 5 and 6 will be respectively denoted by the same reference symbols and their description will be omitted here.

In this mode, the vibration sensing member 4 is rigidly secured by means different form those of FIG. 5. A female screw 20 is cut into the bottom of the case 1 to be fitted to an internal combustion engine from its inner bottom surface and a supporting bolt 21 is engagedly fitted into the female screw 20. A mounting jaw 22 is formed on the supporting bolt 21 to replace the spacer nut 10 in FIG. 5. A male screw section 23 formed as an upper extension to the supporting bolt 21 and having a reduced diameter is driven from under into the vibration sensing member 4 that carries the washer 7 on its lower surface and then into a holder nut 24 with the interposition of a washer 24a so that the male screw section 23 and the holder nut 24 come into engagement with each other and therefore the vibration sensing member 4 is fimly and securely held to the upper bottom surface of the case by way of the mounting jaw 22. With such an arrangement, the lower electrode 5a of the annular piezoelectric element 5 is electrically grounded to the case 1 to be fitted to an internal combustion engine by way of the washer 7 and the supporting bolt 21.

On the other hand, a through bore 3a is cut through the center of the inverted-cup-shaped insulator stopper 3 and a rod-shaped output terminal 25 is fitted into the through bore 3a. A circumferential groove 26 is formed on the lower edge of the rod-shaped output terminal 25. A conductive coil spring 27 is arranged in through bore 3a of the stopper 3 between the vibration sensing member 4 and the rod-shaped output terminal 25 with its upper end engaged into the circumferential groove 26 and its lower end resiliently held in contact with the upper electrode 5b of the annular piezoelectric element 5 at a position located inside the outer periphery of the bulged round seat section (washer 7).

An insulator cap 28 is fitted onto the holder nut 24 in order to prevent the holder nut 24 and the coil spring 27 from being electrically connected with each other.

With this mode of electric connection, the conductive coil spring 27 is held in contact with the annular piezoelectric element 5 at a position located inside the outer periphery of the bulged round seat section (washer 7), or the portion corresponding to D, and therefore the vibration sensing member 4 can freely vibrate if the rod-shaped output terminal 25 is directly connected to it. Here again, the responsiveness of the vibration sensing member 4 is improved by employing a bulged round seat section having an outer diameter greater than the inner diameter of the annular piezoelectric element 5. The use of a lead wire is eliminated. The piezoelectric resonance type knock sensor according to the invention and having such an arrangement is also simple in construction and easy to assemble. The coil spring 27 annularly abuts the inner edge of the annular piezoelectric element 5 to circumferentially evenly urge the latter so that the vibration sensing member 4 is stably held on the washer 7. Since the resilient force of the coil spring 27 is exerted to the center of the stopper 3 by way of the rod-shaped output terminal 25, the stopper 3 is prevented from becoming loose and the electric connections inside the knock sensor is protected against external shocks and other impacts.

Now that the space nut 10 in FIG. 5 or the mounting jaw 22 in FIG. 9 may be omitted if the washer 7 is made thick enough to ensure a sufficient distance between the case 1 and the vibration sensing member 4.

Alternatively, the vibration sensing member 4 may be supported only by the mounting jaw 22 without using the washer 7. If such is the case, the mounting jaw 22 provides a bulged round seat section.

As described above in detail, the piezoelectric resonance type knock sensor according to the invention comprises a bulged round seat section arranged under the lower surface of the thin metal plate 6 and coaxially with the supporting bolt 9 in such a way that the outer diameter of the bulged round seat section exceeds the inner diameter of an annular piezoelectric element 5. The piezoelectric resonance type knock sensor having such a configuration shows a broadened bandwidth BW and a remarkably improved responsiveness and the resonance frequency of its vibration sensing member can be regulated very easily to make itself a highly responsive and effective knock sensor. On the other hand, since the lower end of the resilient connector member (11a; 27) arranged between the rod-shaped output terminal (11; 25) and the vibration sensing member 4 is resiliently held in contact with the upper electrode 5b of the annular piezoelectric element 5 at a position located inside the outer periphery of the bulged round seat section in order to electrically connect the rod-haped output terminal (11; 25) and the upper electrode Sb of the annular piezoelectric element 5 without using a lead wire, the number of lead wires to be used for electric connection can be minimized to allow the vibration sensing member 4 freely vibrate. Thus, there is provided a piezoelectric resonance type knock sensor that is simple in configuration and easy to assemble and has a number of advantages including that the stopper 3 is securely held under a tight condition because of the resilient force exerted by the resilient connector member (11a; 27).

We claim:

1. A piezoelectric resonance type knock sensor for an internal combustion engine comprising:
   a casing which is fitted to the engine;
   a vibration sensing member including
      a thin metal plate, and
      an annular piezoelectric element provided on a surface of said thin metal plate and having first and second electrodes on opposite surfaces thereof with said second electrode being grounded, said piezoelectric element including an inner diameter and an outer diameter;
   a supporting bolt passing through an axial center of said thin metal plate for supporting said vibration sensing member in said case;
   a bulged round seat member which is coaxial with said supporting bolt and integrally provided between said thin metal plate and said casing for controlling a resonance frequency of said vibration sensing member to be substantially the same as a knock vibration frequency of the internal engine, said round seat member having an outer diameter greater than the inner diameter of said annular piezoelectric element;
   a rod shaped output terminal which extends through said casing; and
   a resilient connector member which electrically connects one end of said rod shaped output terminal to said vibration sensing member, said resilient connector including a contact end which is resiliently pressed into contact with said first electrode of said piezoelectric element at a position located radially inside of an outer periphery of said bulged round seat member.

2. A piezoelectric resonance type knock sensor as claimed in claim 1, wherein said resilient connector member comprises of a resilient connector lug extending from said one end of the rod-shaped output terminal, and a contact end of the resilient connector lug is resiliently held in contact with said first electrode of the annular piezoelectric element at a position located inside the outer periphery of the bulged round seat section to electrically connect the rod-shaped output terminal and the annular piezoelectric element.

3. A piezoelectric resonance type knock sensor as claimed in claim 1, wherein said resilient connector member comprises a conductive coil spring, the rod-shaped output terminal is extended through a stopper for sealing an opening of the case, said conductive coil spring being arranged between the rod-shaped output terminal and the vibration sensing member with a contact end resiliently held in contact with the first electrode of the annular piezoelectric element at a position located inside the outer periphery of the bulged round seat section to electrically connect the rod-shaped output terminal and the annular piezoelectric element.

4. A piezoelectric resonance type knock sensor as claimed in claim 1, wherein said bulged round seat member comprises a washer arranged under said thin metal plate.

5. A piezoelectric resonance type knock sensor as claimed in claim 1, wherein said bulged round seat member comprises a bulged portion formed on the center of said thin metal plate.

6. A piezoelectric resonance type knock sensor as claimed in claim 1, wherein said bulged round seat member comprises a mounting jaw formed on said supporting bolt.

* * * * *